(12) United States Patent
Grechuhin et al.

(10) Patent No.: US 12,483,567 B2
(45) Date of Patent: Nov. 25, 2025

(54) MALICIOUS REQUEST DETECTION

(71) Applicant: HUMAN SECURITY, INC., New York, NY (US)

(72) Inventors: Marina Grechuhin, New York, NY (US); Moshe Ingber, New York, NY (US); Ori Gold, New York, NY (US)

(73) Assignee: HUMAN SECURITY, INC., New York, NY (US)

( * ) Notice: Subject to any disclaimer, the term of this patent is extended or adjusted under 35 U.S.C. 154(b) by 140 days.

(21) Appl. No.: 18/389,475

(22) Filed: Nov. 14, 2023

(65) Prior Publication Data
US 2025/0159000 A1 May 15, 2025

(51) Int. Cl.
*H04L 9/40* (2022.01)
*G06N 20/00* (2019.01)

(52) U.S. Cl.
CPC ......... *H04L 63/1416* (2013.01); *G06N 20/00* (2019.01); *H04L 63/10* (2013.01)

(58) Field of Classification Search
None
See application file for complete search history.

(56) References Cited

U.S. PATENT DOCUMENTS

| | | | | |
|---|---|---|---|---|
| 2011/0185421 A1* | 7/2011 | Wittenstein | ......... | H04L 63/1416 726/22 |
| 2015/0106870 A1* | 4/2015 | Li | ............ | G06F 21/54 726/1 |
| 2019/0173900 A1* | 6/2019 | Safruti | ............ | H04L 67/02 |
| 2019/0190946 A1* | 6/2019 | Nagaraja | ............ | G06N 3/006 |
| 2020/0151617 A1* | 5/2020 | Chauhan | ............ | G06N 20/00 |
| 2021/0344661 A1* | 11/2021 | Krylov | ............ | H04L 67/535 |
| 2021/0377303 A1* | 12/2021 | Bui | ............ | G06F 40/14 |
| 2023/0018387 A1* | 1/2023 | Kuksta | ............ | G06F 16/954 |
| 2023/0254330 A1* | 8/2023 | Singh | ............ | G06F 11/323 726/23 |
| 2024/0106846 A1* | 3/2024 | Kapoor | ............ | H04L 63/10 |

FOREIGN PATENT DOCUMENTS

CN  109241383 A * 1/2019  ......... G06K 9/6256

OTHER PUBLICATIONS

Kaul et al., AI to Detect and Mitigate Security Vulnerabilities in APIs: Encryption, Authentication, and Anomaly Detection in Enterprise-Level Distributed Systems, Eigenpub Review of Science and Technology, 2021, 29 total pages (Year: 2021).*

* cited by examiner

*Primary Examiner* — Christopher C Harris
(74) *Attorney, Agent, or Firm* — SQUIRE PATTONG BOGGS (US) LLP

(57) ABSTRACT

Systems, methods, apparatuses, and computer program products for analyzing malware traffic with direct malware detonation. The method may include, collecting page data of a website, and information of a user request. The method may also include generating an algorithm and a baseline of authorized activity with the collected page data and the information of the user request. In addition, the method may include establishing legitimacy of the user request based on the algorithm and the baseline. Further, the method may include controlling access to a web application based on the legitimacy of the user request.

15 Claims, 6 Drawing Sheets

MALICIOUS REQUEST DETECTION

FIELD

Some example embodiments may generally relate to malicious code, malicious activity or bot activity detection. For example, certain example embodiments may relate to apparatuses, systems, and/or methods for detecting malicious requests.

BACKGROUND

Online security may relate to the process of developing, adding, and testing security features within non-mobile and mobile computing devices to prevent security vulnerabilities against threats, such as unauthorized modification and/or malicious activity or behavior. Securities against malware may be an important feature because computing devices connected over various networks and connected to the cloud may have increased vulnerabilities to security threats. It may also be important to protect customers from bots and other malicious requests. Thus, there is an increasing need to not only ensure security at the network level, but also within individual computing devices and software applications installed and executed in the computing devices.

SUMMARY

Some example embodiments may be directed to a method. The method may include collecting page data of a website, and information of a user request. The method may also include generating an algorithm and a baseline of authorized activity with the collected page data and the information of the user request. The method may further include establishing legitimacy of the user request based on the algorithm and the baseline. In addition, the method may include controlling access to a web application based on the legitimacy of the user request.

Other example embodiments may be directed to an apparatus. The apparatus may include at least one processor and at least one memory storing instructions that, when executed by the at least one processor, cause the apparatus at least to collect page data of a website, and information of a user request. The apparatus may also be caused to generate an algorithm and a baseline of authorized activity with the collected page data and the information of the user request. The apparatus may further be caused to establish legitimacy of the user request based on the algorithm and the baseline. In addition, the apparatus may be caused to control access to a web application based on the legitimacy of the user request.

Other example embodiments may be directed to an apparatus. The apparatus may include means for collecting page data of a website, and information of a user request. The apparatus may also include means for generating an algorithm and a baseline of authorized activity with the collected page data and the information of the user request. The apparatus may further include means for establishing legitimacy of the user request based on the algorithm and the baseline. In addition, the apparatus may include means for controlling access to a web application based on the legitimacy of the user request.

In accordance with other example embodiments, a non-transitory computer readable medium may be encoded with instructions that may, when executed in hardware, perform a method. The method may include collecting page data of a website, and information of a user request. The method may also include generating an algorithm and a baseline of authorized activity with the collected page data and the information of the user request. The method may further include establishing legitimacy of the user request based on the algorithm and the baseline. In addition, the method may include controlling access to a web application based on the legitimacy of the user request.

Other example embodiments may be directed to a computer program product that performs a method. The method may include collecting page data of a website, and information of a user request. The method may also include generating an algorithm and a baseline of authorized activity with the collected page data and the information of the user request. The method may further include establishing legitimacy of the user request based on the algorithm and the baseline. In addition, the method may include controlling access to a web application based on the legitimacy of the user request.

Other example embodiments may be directed to an apparatus that may include circuitry configured to collect page data of a website, and information of a user request. The apparatus may also include circuitry configured to generate an algorithm and a baseline of authorized activity with the collected page data and the information of the user request. The apparatus may further include circuitry configured to establish legitimacy of the user request based on the algorithm and the baseline. In addition, the apparatus may include circuitry configured to control access to a web application based on the legitimacy of the user request.

BRIEF DESCRIPTION OF THE DRAWINGS

For proper understanding of example embodiments, reference should be made to the accompanying drawings, wherein.

DETAILED DESCRIPTION

Figure 1:
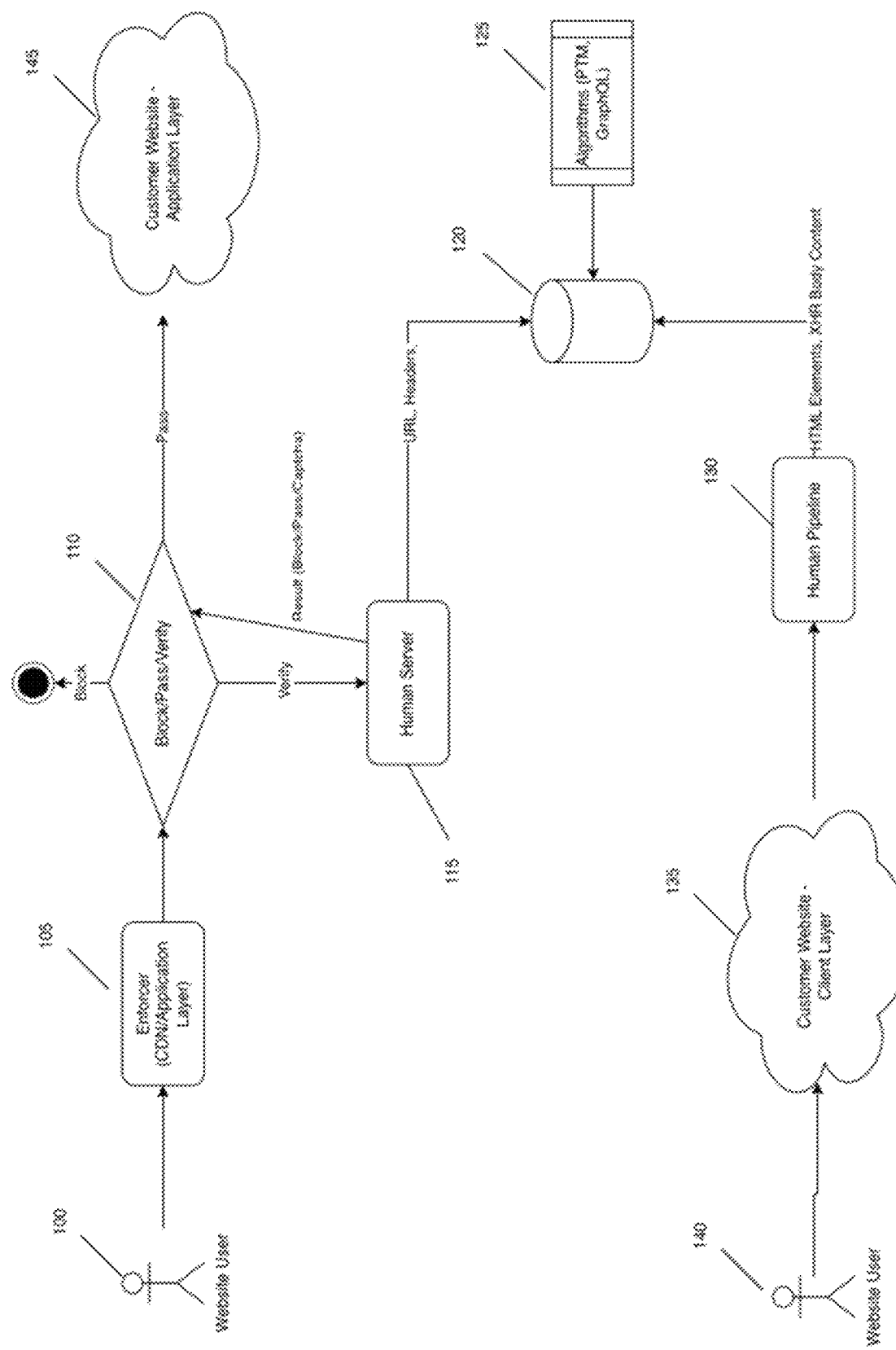
FIG. 1 illustrates an example traffic detection architecture, according to certain example embodiments.

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for detecting malicious requests. For instance, in certain example embodiments, client side data may be used to assist with decision making on website pages and application programming interface (API) requests, and automatic classification.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments. Further, as used herein, "website" and "webpage" maybe used interchangeably.

As described herein, certain example embodiments may be implemented in a computer network environment such as, for example, in a network with one or more servers, one or more client devices (e.g., computers, mobile computers, etc.) associated with one or more users of the client devices, and one or more databases that are configured to store information. In some example embodiments, the network may be connected to and/or have access to the Internet which may enable the client devices to access one or more access webpages. In other example embodiments, the network may include a client side and a server side.

As noted above, to be able to protect customers from bots and other malicious requests, certain example embodiments may determine the intent of each request. For instance, the intent may correspond to the type of business logic or operation that is taking place, and the type of outcome that the visitor (e.g., user) to the website is trying to achieve. This information may be extracted from the network request, as that is the integration point, not the web application itself.

For full visibility, access to the requests' body and metadata (e.g., universal resource locator (URL), headers, etc.) may be needed. Understanding the intent only from the metadata may not always be possible and, thus, numerous malicious requests (e.g., account takeover) may be missed if there is no access to the requests' body. Since processing vast numbers of body requests may be expensive and time consuming, other methods may be needed to accomplish this task. As such, certain example embodiments described herein may provide solutions to the above-described problems, and provide enhancements in protecting customers.

According to some example embodiments, client side code may be used to collect data on an application (e.g., software application), webpages, and requests (e.g., application programming interface (API) requests). The client side may also provide assistance to a Human server in making more accurate decisions by using the collected data. For example: getting html elements on the page can be used to determine the page type (i.e. username and password boxes—may indicate it is a login page), mouse movements can be analyzed to determine if it t is a real user or bot. Collecting the data from the client side may allow for the possibility of analyzing the payload and requests coming from the client since the client side code runs in the application context and may better understand the requests, intent, and flow.

For instance, in certain example embodiments, with respect to API requests received from a user via a client device, analyzing the type of the request, as well as understanding the source and finding anomalies may be challenging when done from the server side only. Thus, by adding client side code that parses the API requests, and extracting the relevant data (body of the request: to analyze GraphQL queries, POST requests intent, etc.), algorithms may be configured to make better decisions since they may use more complete data that is collected in a better context, as analyzing the application or page in runtime and with the access to the software, libraries, memory, and/or application context provides richer data and understanding of the application state vs. deducing said information for request or passive network information only. In some example embodiments, the context may correspond to where the request originated from, from which page, and sometimes from which html element. The addition of data collected using client side code may also provide the ability to mark requests initiated by standard users (e.g., users running the client side code) and standard applications (e.g., the application provided by the application developer, or their allowed partners) vs. other potentially fraudulent applications (e.g., from custom application accessing the API calls, or the website not through the means originally designed or approved by the application developer), which may help highlight non-standard requests (e.g., from bots that impersonate users). According to other example embodiments, in the case of webpage data, by analyzing and extracting page Hypertext Markup Language (HTML) elements, it may be possible to implement more accurate classification algorithms, which may be capable of providing more accurate classifications of webpage types. In certain example embodiments, by adding data from the client side, where there is more context for an application logic, user-flow may improve, and it may be possible to simplify the analysis of an application, classification of data, and detection of patterns including, for example, legitimate flows within the application, and legitimate, or known usage.

In certain example embodiments, since the client side may be less sensitive to data manipulation, a clean baseline may be created based on data collected from the client side. For instance, in some example embodiments, users on the client side may be mostly real users, which means that it may be possible to create a behavioral baseline according to such data. Establishment of the baseline may also involve understanding how users behave on certain pages, and how they are interacting, which may enable the ability to discern what anomalies (i.e., bots) look like. In other example embodiments, the baseline may affect the quality of the dataset that the algorithms are based on. For instance, if a dataset that is mostly built from real user interactions is created, instead of a dataset that includes both bots and users, it may be more advantageous to recognize bots.

As discussed herein, certain example embodiments may determine the legitimacy of API requests received from a website user (i.e., client). For instance, the legitimacy of the requests may be established based on certain algorithms implemented in a machine learning (ML) model, and additional collected features on the server side to detect malicious traffic and/or malicious attacks. Some example embodiments may implement a sensor to collect HTML information on various pages of a website, metadata, and the body of API requests. In some example embodiments, the sensor may be Javascript incorporated into the website. The type of information collected may depend on the algorithms used for the collected information. According to certain example embodiments, the information obtained from the various pages of the website may include page data to create the clean dataset (i.e., baseline). In some example embodiments, multiple baselines may be created depending on the page type. The page data may include, but not limited to, for example, uniform resource locator (URL) parts (i.e., scheme, path, and/or query string), visible HTML input elements data (i.e., input elements, radio buttons, drop downs, buttons, etc.), and visible HTML form element data (i.e., element attributes, location on page, and/or size). Additionally, the visitable HTML elements data may include element attributes (i.e., ID, name, type, label, etc.), location on a page (x, y), and/or element size. The visible HTML form element data may include element attributes, location on the page, and/or size. Furthermore, the page elements data may include visible HTML form element data, which may include, for example, element attributes, location on the page, and size. Additionally, the API request may include, but not limited to, for example, a body (i.e., body of the http request), metadata (e.g., origin page URL, request URL, headers, body, etc.), and/or request structure and order elements, for example data in JSON format including a list of sent attributes (keys) and/or the values reported, as well as the order of the elements in such reported data.

In certain example embodiments, the collected data from the sensor may be used to create one or more algorithms that may run on the server side. For instance, in some example embodiments, the baseline, collected data, and algorithms may be fed into a ML model which may use the baseline, collected data, and algorithms to determine a legitimacy of an API request. According to certain example embodiments, the ML model may use the algorithm and collected data to compare against the baseline, and access may be granted when the request corresponds to the baseline. Additionally, access may be granted or users may be blocked in accordance to the ML model(s) results. According to other example embodiments, some user blocking rules may depend on the page type (e.g., login pages may have different rules than the product search pages). In some example embodiments, legitimate users on a certain website may behave in certain ways, come from certain ISPs, etc. If, in certain example embodiments, a certain diversion from a certain behavior is recognized, such behavior may be blocked. In other additional embodiments ML models can be used to learn and determine from collected data the type of the page (e.g., a login page or a payment page), or type of the action (e.g. a login request, or initiation of money transaction).

According to certain example embodiments, the collected information from the sensor may be used to create a baseline and a clean dataset. The API request may be used to determine a purpose of the API request. Since many requests may look similar on the surface, collecting the information from the client side may provide the ability to analyze the logic and the flow that leads to the sent API request. As such, it may be possible to assist in the classification of the intent or type of request. For instance, in certain embodiments, assistance in the classification of the intent or type of request may be performed using the collected data to feed to an ML model or other algorithm to automatically classify pages, requests, or activities.

In certain example embodiments, the collected data from the sensor may be used to create algorithms that run on the server side. By establishing legitimacy of the requests based on these algorithms and additional collected features on the server side, it may be possible to improve attack detection.

According to certain example embodiments the sensor may be a Javascript sensor. The JavaScript sensor may be in a webpage, and the same may also be applicable for example, with a software development kit (SDK) added to a native application such as, for example, a mobile application. The SDK may live within the application logic, and may collect contextual data (e.g., the state of the user (logged in; guest), the location on a page (click on the bottom, certain page area) about the application and the decision, including the application module or stage running at a given time, internal states of the application and the user, the routines calling the APIs, and the logic they try to implement around them. The SDK may also have access to a library used to generate and parse the API requests, including the body and metadata, and report it.

FIG. 1 illustrates an example traffic detection architecture, according to certain example embodiments. As illustrated in FIG. 1, traffic detection may be split into two sides including, for example, a client side (140, 135, 130, 120, and 125), and a server side (100, 105, 110, and 115). On the client side, the traffic detection architecture may include a customer website (e.g., client layer) 135. According to certain example embodiments, the customer website 135 may be running a Javascript (i.e., Javascript sensor) which gathers information on various pages of the website, as described above with respect to the sensor. Additionally, a human pipeline 130 may be provided, which may represent a service that is responsible for receiving and processing the requests sent by the Javascript in customer website 135, and saving them into a datastore 120. The datastore 120 may hold all the information gathered on the client side, and the outcome of various algorithms using the gathered data. In some example embodiments, the algorithms 125 may include one or more algorithms that use the data stored in the client side to determine whether to block or pass requests (see 110 in FIG. 1) from website users to the customer website 145.

On the server side, the traffic detection architecture in FIG. 1 may include a website user 100 that is accessing and surfing a website. An enforcer 105 may intercept all the requests from the website user 100 before the requests reach the website application backend. Additionally, the enforcer 105 may be a content delivery network (CDN) or an applicative (i.e., an SDK integrated into the customer's code base) enforcer. At 110, a decision may be made by the enforcer of whether to block, pass, or double verify each request that it intercepts. In certain example embodiments, the decision at 110 may be based on a set of custom rules, and may rely on (among other things) the information generated by the algorithms in 125. The traffic detection architecture may also include a server 115, may store "risk" messages, which may include all requests that are not marked as "pass" or "block". The server 115 may decide, based on a set of rules and the information generated by the algorithms 125, whether to approve, block, or present with a "captcha" (Completely Automated Public Turing Test to Tell Computers and Humans Apart) to the user. If it is determined that the request is legitimate (e.g., "pass"), the website user 100 may be granted access to the application layer of the customer website 145.

As noted above, the server of certain example embodiments may use the collected information from the sensor to perform page type mapping to categorize or identify pages of a website. For instance, in some example embodiments, page type mapping may include the categorization of website pages by identifying the page as a login page, payment page, shipping page, search page, product page, etc. According to certain example embodiments, the categorization of the website pages may be performed according to different elements on each page. For example, the elements on each page may include, but not limited to, input elements (i.e., attributes such as ID, name, type, and label), an inline frame (iframe), and page URL parts (i.e., scheme, path, query, and/or string). The input elements may also include HTML elements of x, y, width, and height. In certain example embodiments, the HTML elements of x, y, width, and height may correspond to <img src="img_girl.jpg" width="500" height="600">, any html element on the page (i.e., image, button, iframe, text box, text area, etc.). In some example embodiments, the categorization may be performed by using the ML model.

As an example of page type mapping, a URL may be provided, such as, for example: <input class="GD3asS+ field-input" type="text" data-lpignore="true" placeholder="Enter your email" id="email" name="email" value="">. In this example URL, the size may be 42 px×328 px. Additionally, the input type may be, for example: <input type="search" class="dark-search-input long-placeholder" autocomplete="off" placeholder="What service are you looking for today?"value="">. According to the data above, the ML model may determine that the page is a login page, as the email text box is a central, significantly large element of the page, and differs from the search box (or a newsletter in wording).

According to certain example embodiments, by using the above page category, it may be possible to significantly reduce the API requests that need to be analyzed to determine their purpose/intent. For instance, if an API request originated from a page that was categorized as "login", then it may become a "login API request" candidate, and only these API requests would be analyzed via another ML model to determine the category.

Figure 2:
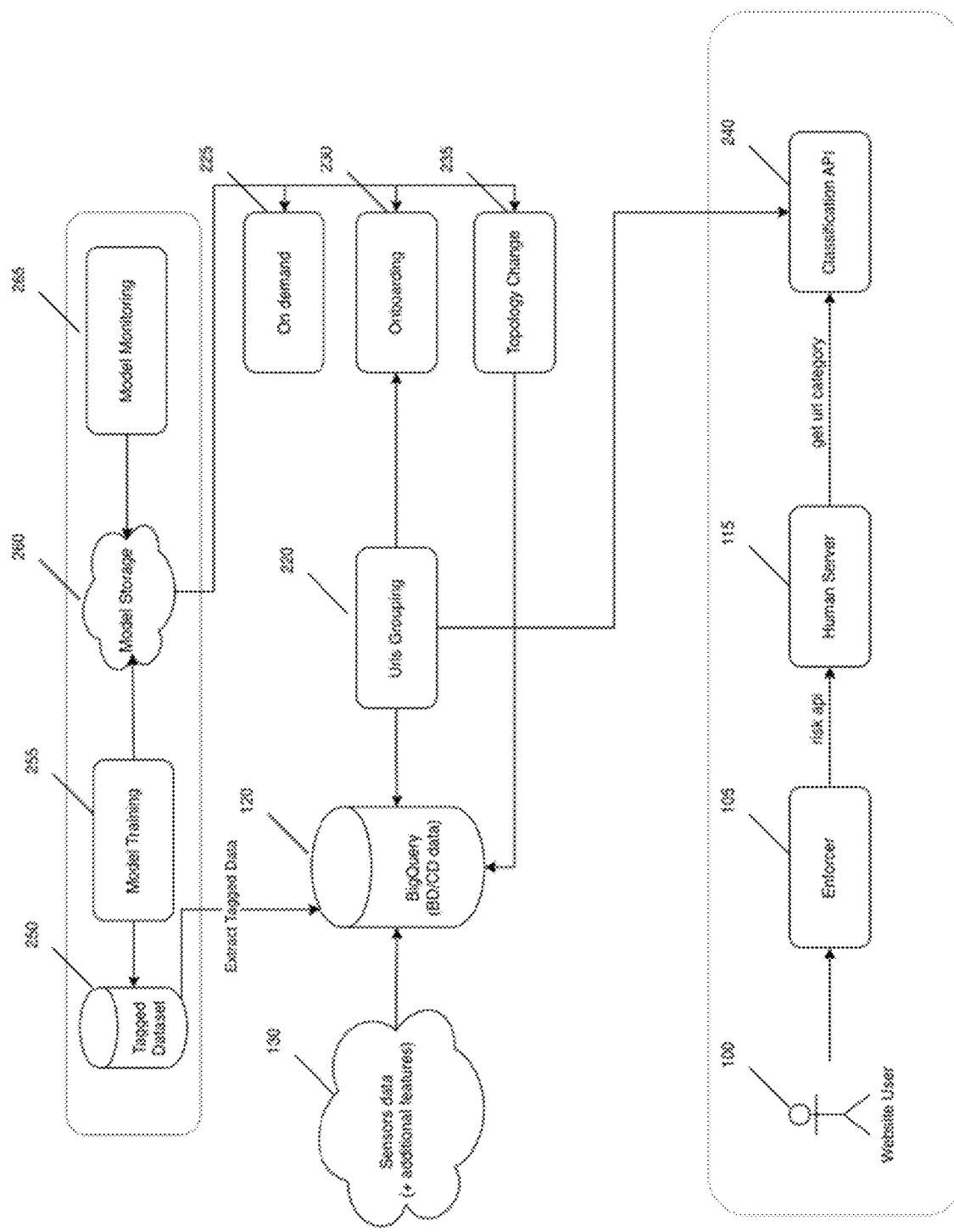
FIG. 2 illustrates an example data architecture, according to certain example embodiments.

FIG. 2 illustrates an example data architecture, according to certain example embodiments. As illustrated in FIG. 2, the data architecture may include a server side (100, 105, and 115), a client side (130 and 120), a page type mapping model (250, 255, 260, and 265), and a page type mapping usage (220, 225, 230, and 235).

With regard to the server side, the website user 100 may access and surf a website. The enforcer 105 may intercept all the requests from the website user 100 before they reach the website application backend. In certain example embodiments, the enforcer may be a CDN or an applicative (i.e., an SDK integrated into the customer's code base) enforcer. The enforcer 105 may forward the requests to the server 115, where all requests that are not marked as "pass" or "block" may be transformed into a "risk" message that may be sent to the server 115. The server 115 may use a page type mapping clustering algorithm output to understand the intent of the request (240), and according to the intent, select a set of rules to apply to the request to be more accurate in the decision. As further illustrated in FIG. 2, the classification API 240 may disclose the results of the page type mapping algorithm to understand the intent of a request.

On the client side in FIG. 2, sensor data 130 may be provided. The sensor data may include, for example, a combination of a website user accessing and surfing the website, the client layer, and human pipeline. As described above, in the client layer, the Javascript may be running on the website, gathering information via the sensor described above. Additionally, the human pipeline may provide a service that is responsible for receiving and processing the requests sent by the Javascript and saving them into a datastore 120. The datastore 120 may hold all the information gathered on the client side and the outcome of various algorithms using the gathered data.

As further illustrated in FIG. 2, the page type mapping model may include a storage 250 that stores tagged dataset extracted from the data that was manually/automatically tagged, and used as a training set for a page type mapping algorithm. At 255, model creation and training service (i.e., to create the ML model) may be provided, which uses the features gathered by the Javascript (130) and tagged. The model created at 255 may be stored in a model storage 260, which may be an accessible cloud storage. At 265, a model monitoring service may be provided, which monitors the health of the model and its accuracy. In other example embodiments, the model monitoring service 265 may determine whether retraining of the model is required.

Figure 3:
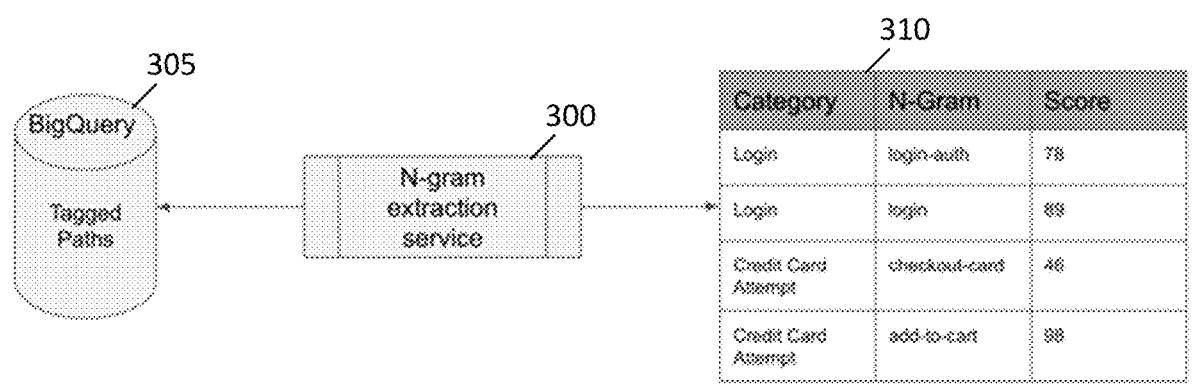
FIG. 3 illustrates an example n-gram extraction service, according to certain example embodiments.

FIG. 3 illustrates an example n-gram extraction service, according to certain example embodiments. For instance, in certain example embodiments, the page type mapping may be constructed from a set of services that help to determine the intent of an incoming request to the customers' (i.e., client/user) servers. In certain example embodiments, the page type mapping algorithm may include an n-gram extraction service to "learn" from the already classified URLs across the customer base, where the n-grams describe a category. The n-grams may be stored in a datastore 305, and results of the n-gram extraction service may be presented as the table 310 which may be separated into different categories, the type of n-gram, and a corresponding probability score.

According to certain example embodiments, to extract n-grams, a particular algorithm may be followed. For instance, the algorithm may use input(s) that generate an output(s). The input may include a set of URLs tagged with a category "S", having a probability threshold "t". For instance, in some example embodiments, some h-grams may have low frequency and therefore be considered irrelevant. Thus, if they have a frequency below some a configurable threshold (this may be per category or generic), they may be discarded. The output may include a set of n-grams with a probability score per category, as shown at 310. The probability score may be the result of any scoring algorithm such as, for example, a term frequency-inverse document frequency (TF-IDF) value. Furthermore, the URLs in set "S" may be split to take only the path part query string keys of the URLs. The path and keys may also be split into words, and the words, and the words may be combined into n-grams (e.g., one, bi, tri, etc.). Additionally, a TF-IDF algorithm may be applied to the n-grams to determine the frequency of each n-gram in the category versus the entire set, and only the n-grams that are above the threshold "t" may be left/remain (others are discarded).

According to other example embodiments, the page type mapping algorithm may also implement a clustering service. For instance, in certain example embodiments, each incoming URL may be categorized (i.e., determining the intent of the URL), and URLs may be unique per user, user session, etc. In further example embodiments, a regular expression may be created that overcomes the uniqueness and correctly identifies the group to which a specific URL belongs. When the regular expression overcomes the uniqueness, the numbers in the URL may be user specific and, thus, if used as they are to determine a page type, they may not be applied to a different user. Thus, user-specific data with a generic pattern may be omitted so that the same expression may be used on multiple users. For example, a regular expression may be as follows: "/+api/+orders/+\d+/+giftCards (/|$)". This example regular expression may describe a group of the following URLs: http://domain.com/api/orders/393477146/giftCards; http://domain.com/api/orders/392476936/giftCards; http://domain.com/api/orders/392485150/giftCards.

In certain example embodiments, the page type mapping algorithm may categorize URLs by implementing a ReqTagger service. For example, the ReqTagger may be a heuristic service that utilizes the n-gram extraction service and static regular expressions describing each category. According to certain example embodiments, the ReqTagger service may include obtaining a list of keywords with an importance score per category of words. The keywords may be arranged in various sets "K", and a configurable threshold "t" for a minimum importance score may be defined. For each customer, and for each page type/category, a list of distinct URLs may be obtained for a configured period of time, and the list of unique URLs may be arranged as a set "S". Each of the URLs in set "S" may be split to take only the path part and the query string keys of each URL, and the path and keys may be split into words. Furthermore, occurrences of n-grams form set "K" in set "S" may be found, and the scores of each occurrence may be summed together. If the score is above "t", then the score may be added to a result set "R". Clustering service on the result set "R" may be used to receive groups of URLs, described by a regular expression, and the regular expression may be assigned to a category.

As described above, an ML model may be used to identify the page category. The input for the ML model may include a list of activities where each activity may include a URL, http methods (e.g., GET, POST, etc.), and/or elements on the page (if the request is a page and not an API call). Each element may include certain attributes such as, for example, a type (e.g., input, drop-down, button, iframe, etc.), ID, name, height, width, location on the screen, and any other applicable HTML element attributes. In some example embodiments, the height and width may correspond to <img src="img_girl.jpg" width="500" height="600">. The output of the ML model may include a predicted category per activity with a score indicating how certain the probability of the URL is to belong to a category.

Returning to FIG. 2, at 220, the page type mapping algorithm may tag each request with an intent of the request by using the ML model. Since the server side may not have the body of the requests, the path and http method (e.g., path may be the "path" part of a URL, http-method (GET, POST, HEAD, etc.), and the output of the page type mapping algorithm may be a regex that accurately describes the paths' group that belong to a single category. Additionally, the clustering service of URLs may group the paths of the URLs into sub-groups that can be described by a regex. At 225, 230, and 235, the requests may be made in a configured time period, and may be tagged to classify them into categories (i.e., intent). The clustering URL (e.g., clustering service) (220) algorithm may be applied to obtain new groups (regexes). For instance, in certain example embodiments, the clustering service algorithm may be invoked in three situations 225, 230, and 235. At 225, the clustering service algorithm may be invoked on demand by the customer or an internal team member. At 230, the clustering service algorithm may be invoked by onboarding, which may be done for the customer as soon as onboarding to the system is completed, and as soon as there is enough data flowing in the system. At 235, the clustering service algorithm may be invoked by a topology change(s) in the website (e.g., routes added/removed) to adjust the intent of the requests.

According to certain example embodiments, GraphQL query language may be used. For instance, GraphQL requests may be transferred in the body of an API request. To understand the intent of the request and be able to protect against attacks on certain calls (i.e., http requests), the request body (from the client side-operation name, query, variable keys, etc.) may be used. Additionally, the URL parts data, and the origin page and its category (login, product, credit card, etc.) may be used. With the above information, a baseline may be established to determine whether the requests to the website are legitimate, and provide a way to recognize outliers on the server side. In certain example embodiments, the baseline may be established by calculating a query depth (depth of the GraphQL query nesting), number of queries (number of queries sent in one request), variable keys and if they are used (or if a password, for example, is injected into the query itself), and intent (i.e., category) of the request. For example, if a baseline determines an average of query depth of 3, and a request is received which has a depth of 9, it is marked as "suspicious". The same may be applicable for variable keys—if the baseline has a key A and B, and a request is received with A, B, and Z—then the request is classified as an "anomaly". Additionally, if the baseline has 1 query per request, and 10 queries are received in one request (with different usernames and passwords for variable keys), then it may be blocked. Thus, it may be possible to set the rules. Further, login pages may have different rules or thresholds (on depth difference, for example) than product search pages.

In certain example embodiments, the intent (i.e., category) of the request may be determined by obtaining a list of n-grams per category from the n-gram extraction service, where "N" is the number of n-grams per category, and "t" is a threshold. In certain example embodiments, "t" may be configurable per category, or it may have a distance calculation of the score from the top n-grams. If, for example, the score of the 3 n-grams before is on average 100, and the score of the n-gram "x" is 0.3, then it will be discarded. For each GraphQL request, the request body/query parameter may be extracted (some GraphQL queries may be sent via the query string). Additionally, for each GraphQL request, GraphQL body may be parsed to find an operation name (optional data), variable keys only (as value might contain personal identifiable information (PII)), and query. A set "N" may be used to calculate the score for the body by summing the occurrences of n-grams in the query body. If the score is above the threshold "t", then the category may be assigned to the request (there may be multiple categories per request).

Figure 4:
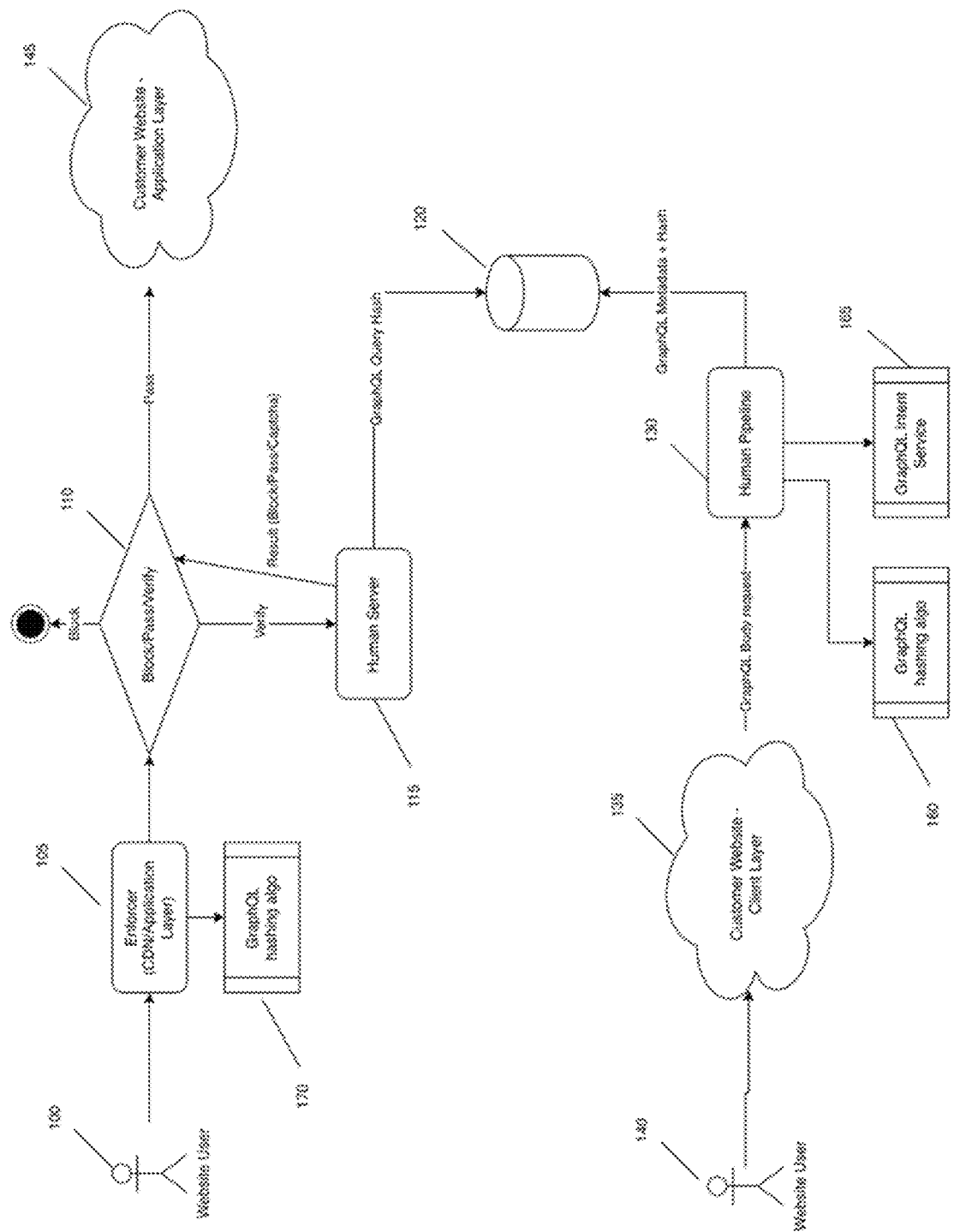
FIG. 4 illustrates an example of another traffic detection architecture, according to certain example embodiments.

FIG. 4 illustrates an example of another traffic detection architecture, according to certain example embodiments. As illustrated in FIG. 4, the traffic detection architecture may include a client side (140, 135, 130, and 120), and a server side (100, 105, 110, and 115). On the client side, the website user 140 may be accessing and surfing the website. At the client layer 135, Javascript may be running on the website, gathering information described above with respect to the sensor gathering information on various pages of the website. A human pipeline 130 may be provided as a service that may be responsible for receiving and processing the requests sent by the Javascript 135, and saving the requests into a datastore 120. The processing of the human pipeline 130 may also calculate, at 160, a hash, and save them into a datastore 120. The processing may also calculate a hash 165 for each request group and identifying the intent of the requests in the group 165. As noted above, the requests may be saved in the datastore 120, which holds all the information gathered on the client side including, for example, GraphQL requests metadata, hash for each group, and an intent of the requests.

As further illustrated in FIG. 4, at the server side, the website user 100 may be accessing and surfing the website. The enforcer 105 may intercept all the requests from a website user, before they reach the website application backend. The enforcer 105 may be a CDN or an applicative (i.e., an SDK integrated into the customer's code base) enforcer. At 110, the enforcer 105 may make a decision of whether to block, pass, or double verify each request it intercepts. For double verification ("risk" request), the enforcer 105 may calculate the hash of the request 170, and send a "risk" message to the server 115. All requests that are not marked as "pass" or "block" may be transformed into a "risk" message that is sent to the server 115. This service may decide, based on the hash sent by the enforcer 105 (and looking for the intent of the request by its hash) in addition to other metadata information of the request, whether to approve, block, or present with captcha (captcha may represent a "verify you are a human" message, and may be any type including, for example, select traffic lights) to the user.

As described above, a form of malicious request may include account takeover. In an account takeover, the body of "login" categorized representational state transfer (REST) requests may be processed to identify compromised credentials of the user in the server side. According to certain example embodiments, the login attempt API may request and send username and password information in the body of the request which may not be visible on the server side. Thus, to determine if the user tries to login with compromised credentials, a baseline may be established. For instance, in certain example embodiments, the baseline may be established by categorizing the origin page algorithm and the category of the API request (the same algorithm used in GraphQL) to prevent interception (on the client side) of all API requests from any page. Further, the body of the API request may be used to extract the credentials, and the server side may then use the baseline to recognize anomalies. In other example embodiments, since a username and password may not always be visible on the server side, to determine if an account was compromised, the request body of the client side request may be used. Additionally, the user+password hash may be checked in a comprised users database to check if the user account as compromised.

Figure 5:
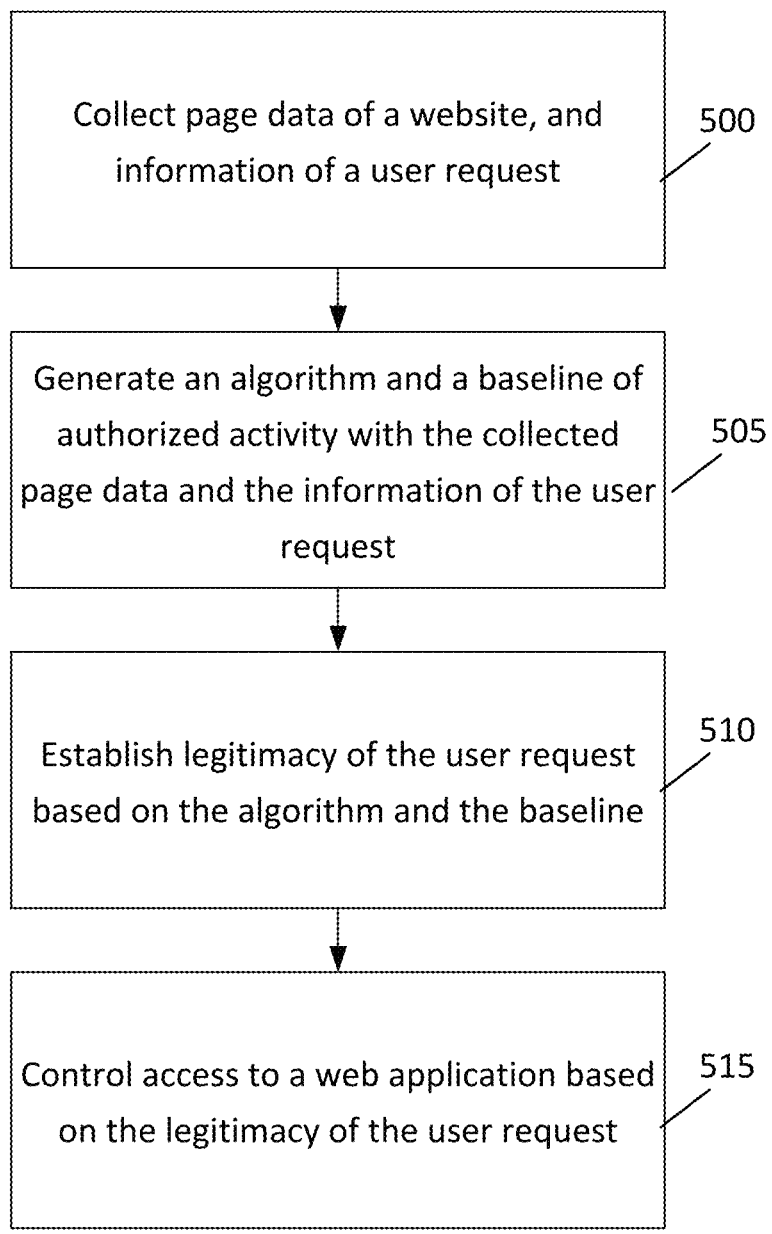
FIG. 5 illustrates a flow diagram of a method, according to certain example embodiments.

FIG. 5 illustrates an example flow diagram of a method, according to certain example embodiments. In an example embodiment, the method of FIG. 5 may be performed by a computing device. For instance, in an example embodiment, the method of FIG. 5 may be performed by a computer, server, or mobile computing device that may be similar to or included in apparatus 10 illustrated in FIG. 6.

According to certain example embodiments, the method of FIG. 4 may include, at 500, collecting page data of a website, and information of a user request. The method may also include, at 505, generating an algorithm and a baseline of authorized activity with the collected page data and the information of the user request. The method may further include, at 510, establishing legitimacy of the user request based on the algorithm and the baseline. Further, the method may include, at 515, controlling access to a web application based on the legitimacy of the user request.

According to certain example embodiments, the page data including at least one of uniform resource locator parts including a scheme, a path, or a query string, hypertext markup language input elements data including an identifier, a name, a type, or a label, or hypertext markup language format element data comprising x, y, width, or height. According to some example embodiments, the user request comprises at least one of a body, metadata, or a request structure and order of elements. According to other example embodiments, the method may also include feeding the algorithm and the baseline into a machine learning model, and dynamically training the machine learning model based on the collected page data of the website.

In certain example embodiments the method may also include determining, via the machine learning model, a web page type based on the collected page data. In some example embodiments, controlling access may include granting access to the web application when the user request is established as legitimate, and denying access to the web application when the request is established as illegitimate. In other example embodiments, the user request may be established as legitimate when the baseline and the information of the user request correspond with each other, and the user request may be established as illegitimate when the baseline and the information of the user request do not correspond with each other.

Figure 6:
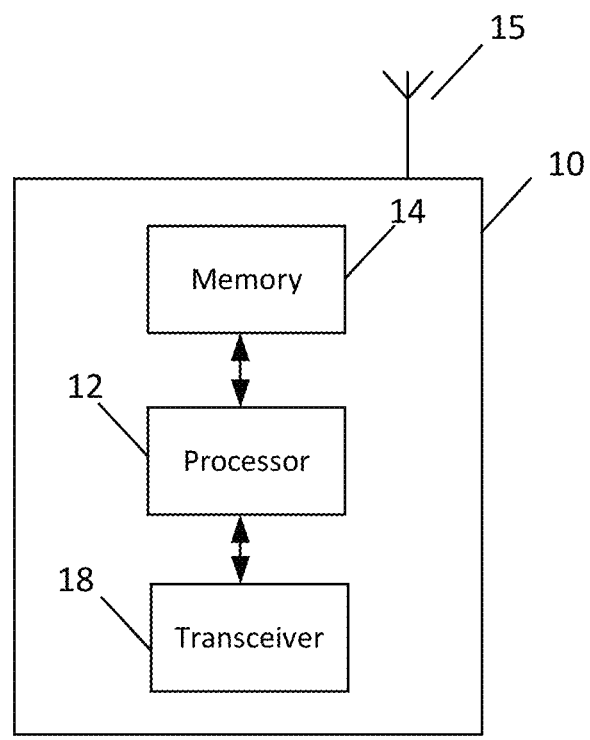
FIG. 6 illustrates an apparatus according to certain example embodiments.

FIG. 6 illustrates an apparatus 10 according to certain example embodiments. In certain example embodiments, apparatus 10 may be a computer, mobile computing device, network device, server, or other similar device. Apparatus 10 may be in communication (i.e., connected to either via wire or wirelessly) with other similar computer devices forming a network of connected computer devices.

In some example embodiments, apparatus 10 may include one or more processors, one or more computer-readable storage medium (for example, memory, storage, or the like), one or more radio access components (for example, a modem, a transceiver, or the like), and/or a user interface.

As illustrated in the example of FIG. 6, apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 6, multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-5.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-5.

In some example embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may include other components, such as filters, converters signal shaping components, and the like, to process symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to certain example embodiments, processor 12 and memory 14 may be included in or may form a part of processing circuitry or control circuitry. In addition, in some example embodiments, transceiver 18 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of a hardware circuit or processor (or multiple processors), or portion of a hardware circuit or processor, and its accompanying software and/or firmware.

In certain example embodiments, apparatus 10 may be controlled by memory 14 and processor 12 to collect page data of a website, and information of a user request. Apparatus 10 may also be controlled by memory 14 and processor 12 to generate an algorithm and a baseline of authorized activity with the collected page data and the information of the user request. Apparatus 10 may further be controlled by memory 14 and processor 12 to establish legitimacy of the user request based on the algorithm and the baseline. Further, apparatus 10 may be controlled by memory 14 and processor 12 to control access to a web application based on the legitimacy of the user request.

In some example embodiments, an apparatus (e.g., apparatus 10) may include means for performing a method, a process, or any of the variants discussed herein. Examples of the means may include one or more processors, memory, controllers, transmitters, receivers, sensors, and/or computer program code for causing the performance of the operations.

Certain example embodiments may further be directed to an apparatus that includes means for performing any of the methods described herein including, for example, means for collecting page data of a website, and information of a user request. The apparatus may also include means for generating an algorithm and a baseline of authorized activity with the collected page data and the information of the user request. The apparatus may further include means for establishing legitimacy of the user request based on the algorithm and the baseline. Further, the apparatus may include means for controlling access to a web application based on the legitimacy of the user request.

Certain example embodiments described herein provide several technical improvements, enhancements, and/or advantages. In some example embodiments, it may be possible to help customers to be better protected from various malicious traffic. It may also be possible to analyze the body of incoming requests sent by users, and avoid expensive costs associated with analyzing the body of a request on the CDN, server side application layer, as these be quite large. Since the client side impersonation may generally be more difficult than sending malicious requests directly to the server, collecting and profiling client side request data may help classify good and bad users, and good and bad behaviors. By using the normal signals to establish a baseline(s), it may be possible to flag anomalies and outliers.

According to other example embodiments, it may be possible to combine both client side Javascript sensor information with the server side data. In doing so, it may be possible to obtain a more complete picture of the users' intent, and stop malicious traffic from reaching the customers' web applications. In further example embodiments, implementing page type mapping may significantly reduce the API requests that need to be analyzed to determine their purpose/intent. For example, if an API request originated from a page that was categorized as "login", then it may become a "login API request" candidate, and only these API requests are analyzed via another ML model to determine the category of the request.

As described herein, a computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of code may be in a source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with procedures in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments.

Partial Glossary

API Application Programming Interface
CDN Content Delivery Network
HTML Hypertext Markup Language
ML Machine Learning
SDK Software Development Kit
TF-IDF Term Frequency-Inverse Document Frequency
URL Universal Resource Locator

We claim:

1. A method, comprising:
collecting page data of a website, and information of a user request;
generating an algorithm and a baseline of authorized activity with the collected page data and the information of the user request, wherein the baseline is generated by determining a query depth, a number of queries sent in the user request, variable keys and if they are used, and a category of the user request;
establishing legitimacy of the user request based on the baseline, wherein the user request is established as legitimate when the information of the user request is within the baseline, and wherein the user request is established as illegitimate when the information of the user request lie outside of the baseline; and
controlling access to a web application based on the legitimacy of the user request by
granting access to the web application when the user request is established as legitimate; and
denying access to the web application when the request is established as illegitimate.

2. The method according to claim 1, wherein the page data comprises at least one of the following:
uniform resource locator parts comprising a scheme, a path, or a query string,
hypertext markup language input elements data comprising an identifier, a name, a type, or a label, or
hypertext markup language format element data comprising x, y, width, or height.

3. The method according to claim 1, wherein the user request comprises at least one of the following:
a body,
metadata, or
a request structure and order of elements.

4. The method according to claim 1, further comprising:
implementing the algorithm and the baseline in a machine learning model; and
dynamically training the machine learning model based on the collected page data of the website.

5. The method according to claim 4, further comprising:
determining, via the machine learning model, a web page type based on the collected page data.

6. An apparatus, comprising:
at least one processor; and
at least one memory comprising computer program code, the at least one memory and the computer program code configured to, when executed by the at least one processor, cause the apparatus at least to:
collect page data of a website, and information of a user request;
generate an algorithm and a baseline of authorized activity with the collected page data and the information of the user request, wherein the baseline is generated by determining a query depth, a number of queries sent in the user request, variable keys and if they are used, and a category of the user request;
establish legitimacy of the user request based on the baseline, wherein the user request is established as legitimate when the information of the user request is within the baseline, and wherein the user request is established as illegitimate when the information of the user request lie outside of the baseline; and
control access to a web application based on the legitimacy of the user request by
granting access to the web application when the user request is established as legitimate; and
denying access to the web application when the request is established as illegitimate.

7. The apparatus according to claim 6, wherein the page data comprises at least one of the following:
uniform resource locator parts comprising a scheme, a path, or a query string,
hypertext markup language input elements data comprising an identifier, a name, a type, or a label, or
hypertext markup language format element data comprising x, y, width, or height.

8. The apparatus according to claim 6, wherein the user request comprises at least one of the following:
a body,
metadata, or
a request structure and order of elements.

9. The apparatus according to claim 6, wherein the at least one memory and the computer program code are further configured to, when executed by the at least one processor, cause the apparatus at least to:
implement the algorithm and the baseline in a machine learning model; and
dynamically train the machine learning model based on the collected page data of the website.

10. The apparatus according to claim 9, wherein the at least one memory and the computer program code are further configured to, when executed by the at least one processor, cause the apparatus at least to:
determine, via the machine learning model, a web page type based on the collected page data.

11. A computer program, embodied on a non-transitory computer readable medium, the computer program comprising computer executable code, which, when executed by a processor, causes the processor to:
collect page data of a website, and information of a user request;
generate an algorithm and a baseline of authorized activity with the collected page data and the information of the user request, wherein the baseline is generated by determining a query depth, a number of queries sent in the user request, variable keys and if they are used, and a category of the user request;
establish legitimacy of the user request based on the baseline, wherein the user request is established as legitimate when the information of the user request is within the baseline, and wherein the user request is established as illegitimate when the information of the user request lie outside of the baseline; and
control access to a web application based on the legitimacy of the user request by
granting access to the web application when the user request is established as legitimate; and
denying access to the web application when the request is established as illegitimate.

12. The computer program according to claim 11, wherein the page data comprises at least one of the following:
uniform resource locator parts comprising a scheme, a path, or a query string,
hypertext markup language input elements data comprising an identifier, a name, a type, or a label, or
hypertext markup language format element data comprising x, y, width, or height.

13. The computer program according to claim 11, wherein the user request comprises at least one of the following:
a body,
metadata, or
a request structure and order of elements.

14. The computer program according to claim 11, wherein the processor is further caused to:
implement the algorithm and the baseline in a machine learning model; and
dynamically train the machine learning model based on the collected page data of the website.

15. The computer program according to claim 14, wherein the processor is further caused to:
determine, via the machine learning model, a web page type based on the collected page data.

\* \* \* \* \*